(12) United States Patent
Boshoff et al.

(10) Patent No.: US 8,552,073 B2
(45) Date of Patent: *Oct. 8, 2013

(54) CO-PRODUCTION OF POWER AND HYDROCARBONS

(75) Inventors: Jan Hendrik Duvenhage Boshoff, Vaalpark (ZA); Isabella Lodewina Greeff, Johannesburg (ZA); Andre Peter Steynberg, Vanderbijlpark (ZA)

(73) Assignee: Sasol Technology (Proprietary) Limited (ZA)

( * ) Notice: Subject to any disclaimer, the term of this patent is extended or adjusted under 35 U.S.C. 154(b) by 1078 days.

This patent is subject to a terminal disclaimer.

(21) Appl. No.: 12/526,822

(22) PCT Filed: Feb. 8, 2008

(86) PCT No.: PCT/IB2008/050457
§ 371 (c)(1),
(2), (4) Date: Aug. 12, 2009

(87) PCT Pub. No.: WO2008/099313
PCT Pub. Date: Aug. 21, 2008

(65) Prior Publication Data
US 2010/0018217 A1  Jan. 28, 2010

Related U.S. Application Data

(60) Provisional application No. 60/900,935, filed on Feb. 12, 2007, provisional application No. 60/901,251, filed on Feb. 14, 2007.

(51) Int. Cl.
*C07C 27/00* (2006.01)
(52) U.S. Cl.
USPC ........... 518/703; 518/700; 518/702; 518/704; 60/780

(58) Field of Classification Search
USPC .................... 518/700–704; 60/780
See application file for complete search history.

(56) References Cited

U.S. PATENT DOCUMENTS

| 4,085,578 A | 4/1978 | Kydd |
| 4,199,327 A | 4/1980 | Hempill |

(Continued)

FOREIGN PATENT DOCUMENTS

| GB | 2237814 | 5/1991 |

OTHER PUBLICATIONS

International Search Report issued by the European Patent Office on Aug. 22, 2008, for International Application No. PCT/IB2008/050457.

(Continued)

*Primary Examiner* — Jafar Parsa
(74) *Attorney, Agent, or Firm* — Sheridan Ross P.C.

(57) ABSTRACT

A process (10) for co-producing power and hydrocarbons includes gasifying (16, 70) coal to produce a synthesis gas (36) and a combustion gas (86) both comprising at least $CO_1H_2$ and $CO_2$ and being at elevated pressure, separating $CO_2$ (18, 48) from the synthesis gas, and synthesizing (20, 22) hydrocarbons from the synthesis gas. Power (1 14) is generated from the combustion gas, including by combusting (78) the combustion gas in the presence of oxygen and in the presence of at least a portion of the separated CO2 as moderating agent to produce a hot combusted gas (106) which includes $CO_2$. The CO2 is recycled (1 12) or recovered from the combusted gas. In certain embodiments, the process (10) produces a $CO_2$ exhaust stream (134) for sequestration or capturing for further use.

14 Claims, 2 Drawing Sheets

(56) References Cited

U.S. PATENT DOCUMENTS

| | | |
|---|---|---|
| 4,211,540 A | 7/1980 | Netzer |
| 4,631,915 A | 12/1986 | Frewer |
| 4,669,270 A | 6/1987 | Frewer |
| 5,669,216 A | 9/1997 | Ankersmit |
| 2004/0045272 A1 | 3/2004 | Miyoshi |
| 2004/0216465 A1 | 11/2004 | Sheppard |
| 2010/0022666 A1 | 1/2010 | Boshoff et al. |

OTHER PUBLICATIONS

Written Opinion issued by the European Patent Office on Aug. 22, 2008, for International Application No. PCT/IB2008/050457.

International Search Report issued by the European Patent Office on Aug. 22, 2008, for International Application No. PCT/IB2008/050456.

Written Opinion issued by the European Patent Office on Aug. 22, 2008, for International Application No. PCT/IB2008/050456.

International Preliminary Report on Patentability issued by the International Bureau of WIPO on Aug. 19, 2009, for International Application No. PCT/IB2008/050456.

Official Action for U.S. Appl. No. 12/526,672, mailed Jan. 31, 2012.

Notice of Allowance for U.S. Appl. No. 12/526,672, mailed Apr. 25, 2012.

International Preliminary Report on Patentability issues by The International Bureau of WIPO on Aug. 19, 2009, for International Application No. PCT/IB2008/050457.

CO-PRODUCTION OF POWER AND HYDROCARBONS

CROSS REFERENCE TO RELATED APPLICATIONS

This application is a national stage application under 35 U.S.C. 371 of PCT Application No. PCT/IB2008/050457 having an international filing date of 8 Feb. 2008, which designated the United States, which PCT application claimed the benefit of U.S. Application No. 60/900,935 filed 12 Feb. 2007 and U.S. Application No. 60/901,251 filed 14 Feb. 2007, the entire disclosures of each of which are incorporated herein by reference.

BACKGROUND OF THE INVENTION

THIS INVENTION relates to the co-production of power and hydrocarbons. In particular, the invention relates to a process for co-producing power and hydrocarbons.

Integrated Gasification Combined Cycle (IGCC) processes have environmental advantages over conventional coal-fired power plants. Synthesis gas produced by a gasifier of the IGCC process can also be used as a feedstock for co-production of liquid hydrocarbons and/or chemicals. In view of environmental pressures to reduce $CO_2$ emissions to the atmosphere, a hydrocarbon synthesis process integrated with an IGCC process that provides the opportunity for capturing of $CO_2$ for sequestration would be desirable.

It is possible to capture $CO_2$ exhausted from a gas turbine unit of an IGCC process by removing the $CO_2$ from the exhaust or stack gases. However, such exhaust or stack gases are at a low pressure and the removal of $CO_2$ would conventionally require separation of $CO_2$ and $N_2$ that was introduced by combustion air fed to a combustor of the gas turbine unit. An alternative approach is to minimise the $CO_2$ concentration in the exhaust or stack gases, e.g. by running the gas turbine on $H_2$. In this approach, $CO_2$ is removed from the combustion gas (mostly $H_2$) fed to the combustor, rendering the exhaust or stack gases a mixture predominantly of $N_2$ and water. However, $H_2$ has a low heating value compared to other potential combustion gases containing CO and/or $CH_4$.

It would be an advantage to provide an IGCC process integrated with a hydrocarbon production process which shows economic (i.e. capital and operating cost) benefits and environmental benefits.

SUMMARY OF THE INVENTION

According to the invention, there is provided a process for co-producing power and hydrocarbons, the process including
gasifying coal to produce a synthesis gas and a combustion gas both comprising at least CO, $H_2$ and $CO_2$ and being at elevated pressure;
separating $CO_2$ from the synthesis gas;
synthesizing hydrocarbons from the synthesis gas;
generating power from the combustion gas, including combusting the combustion gas in the presence of oxygen and in the presence of at least a portion of said separated $CO_2$ as moderating agent to produce a combusted gas which includes $CO_2$; and
recovering or recycling the $CO_2$ from the combusted gas or a gas derived therefrom.

As used in this specification, the term wet gasification stage means an entrained flow gasification stage in which water is used as a carrier for solid feedstock (e.g. coal). It is thus a slurry that is fed to the gasification stage.

As used in this specification, the term dry gasification stage means an entrained flow gasification stage in which a gas is used as a carrier for solid feedstock (e.g. coal).

The coal may be gasified in a wet gasification stage to produce the combustion gas and in a dry gasification stage to produce the synthesis gas.

The combustion gas may be produced at a pressure of at least 45 bar, more preferably at least 55 bar, most preferably at least 65 bar, e.g. about 70 bar. Typically, the wet gasification stage uses a water quench to cool the combustion gas.

The molar ratio of $H_2$ and CO in the combustion gas may be higher than the molar ratio of $H_2$ and CO in the synthesis gas. For avoidance of doubt, the phrase "the molar ratio of $H_2$ and CO" as used in this specification means the molar concentration of $H_2$ divided by the molar concentration of CO. The molar ratio of $H_2$/CO has an identical meaning.

The molar ratio of $H_2$/CO in the combustion gas may be at least 0.6. Preferably, the molar ratio is at least 0.8, more preferably at least 0.9, e.g. about 0.96. Typically, the molar ratio of $H_2$/CO in the combustion gas is between 0.6 and 1.0.

The dry gasification stage should produce synthesis gas at a pressure which is sufficiently high, taking into account pressure losses over process units to allow hydrocarbon synthesis at a suitably high pressure. Typically the synthesis gas precursor is at a pressure of between about 40 bar and about 50 bar, e.g. about 45 bar. Typically, the dry gasification stage includes a gasification stage waste heat boiler.

The molar ratio of $H_2$/CO in the synthesis gas may be between about 0.3 and about 0.6, preferably between about 0.3 and about 0.4, e.g. about 0.4.

The process may include enriching a first portion of the combustion gas with $H_2$ to produce an $H_2$-enriched gas. Enriching a first portion of the combustion gas with $H_2$ may include subjecting said first portion of the combustion gas to water gas shift conversion thereby to produce the $H_2$-enriched gas. Typically the water gas shift conversion is a sour shift, i.e. containing a catalyst suitable for reacting carbon monoxide and water to produce additional hydrogen in the presence of sulphur.

The process may include purifying a portion of the $H_2$-enriched gas, e.g. by using membranes and/or pressure swing adsorption, to produce essentially pure hydrogen. The essentially pure hydrogen may be used for hydro-processing of hydrocarbons synthesised from the synthesis gas.

The process may include mixing at least a portion of the $H_2$-enriched gas with the synthesis gas, prior to synthesizing hydrocarbons from the synthesis gas, to provide synthesis gas with a higher molar ratio of $H_2$/CO.

The $H_2$-enriched gas may be at elevated pressure. Mixing at least a portion of the $H_2$-enriched gas with the synthesis gas may include passing the $H_2$-enriched gas through an expansion turbine to generate power.

Generating power from the combustion gas typically includes expanding the combusted gas through a gas turbine expander to generate power and to produce hot exhaust gas, with the $CO_2$ then being recovered from the hot exhaust gas. Typically, the combustion of the combustion gas occurs in a combustor. The hot exhaust gas may be at or above atmospheric pressure.

Generating power from the combustion gas may also include recovering heat from the hot exhaust gas in a waste heat recovery stage. Typically, the waste heat recovery stage includes a waste heat recovery stage waste heat boiler. Typically, recovering heat from the hot exhaust gas in the waste heat recovery stage thus includes generating steam in the waste heat recovery stage waste heat boiler. The generated steam may be used to drive a steam turbine to produce power, or the steam may be used elsewhere in the process for other purposes.

The waste heat recovery stage waste heat boiler may be a co-fired waste heat boiler. The synthesising of hydrocarbons from the synthesis gas may produce a fuel gas. The waste heat recovery stage waste heat boiler may be co-fired with the fuel gas to raise the pressure and/or the temperature of the steam generated by the waste heat recovery stage waste heat boiler.

The process may include separating air to produce oxygen. The oxygen may be used to combust the combustion gas to produce the hot combusted gas.

Typically, the oxygen must be produced at pressure to exceed the operating pressure of a combustor in which the combustion gas is combusted. Typically, liquid oxygen is pumped to the required pressure and the liquid oxygen is then heated to produce oxygen gas which is then used to combust the combustion gas.

The oxygen, at lower pressure, may also be used to combust the fuel gas thereby to co-fire the waste heat recovery stage waste heat boiler.

The oxygen is typically also used in the wet gasification stage and in the dry gasification stage to gasify coal. This oxygen is the highest pressure oxygen used and the required pressure is typically achieved by pumping liquid oxygen, which is then evaporated at pressure.

Synthesising hydrocarbons from the synthesis gas may be effected in any conventional fashion. Typically, the synthesising of hydrocarbons from the synthesis gas includes Fischer-Tropsch synthesis using one or more Fischer-Tropsch hydrocarbon synthesis stages, producing one or more hydrocarbon product streams and a Fischer-Tropsch tail gas which includes $CO_2$, CO and $H_2$.

The one or more Fischer-Tropsch hydrocarbon synthesis stages may be provided with any suitable reactors such as one or more fixed bed reactors, slurry bed reactors, ebullating bed reactors or dry powder fluidised bed reactors. The pressure in the reactors may be between 1 bar and 100 bar, typically below 45 bar, while the temperature may be between 160° C. and 380° C.

One or more of the Fischer-Tropsch hydrocarbon synthesis stages may be a low temperature Fischer-Tropsch hydrocarbon synthesis stage operating at a temperature of less than 280° C. Typically, in such a low temperature Fischer-Tropsch hydrocarbon synthesis stage, the hydrocarbon synthesis stage operates at a temperature of between 160° C. and 280° C., preferably between 220° C. and 260° C., e.g. about 250° C. Such a low temperature Fischer-Tropsch hydrocarbon synthesis stage is thus a high chain growth, typically slurry bed, reaction stage, operating at a predetermined operating pressure in the range of 10 to 50 bar, typically below 45 bar.

One or more of the Fischer-Tropsch hydrocarbon synthesis stages may be a high temperature Fischer-Tropsch hydrocarbon synthesis stage operating at a temperature of at least 320° C. Typically, such a high temperature Fischer-Tropsch hydrocarbon synthesis stage operates at a temperature of between 320° C. and 380° C., e.g. about 350° C., and at an operating pressure in the range of 10 to 50 bar, typically below 45 bar. Such a high temperature Fischer-Tropsch hydrocarbon synthesis stage is a low chain growth reaction stage, which typically employs a two-phase fluidised bed reactor. In contrast to the low temperature Fischer-Tropsch hydrocarbon synthesis stage, which may be characterised by its ability to maintain a continuous liquid product phase in a slurry bed reactor, the high temperature Fischer-Tropsch hydrocarbon synthesis stage cannot produce a continuous liquid product phase in a fluidised bed reactor.

The Fischer-Tropsch tail gas may be treated to remove $CO_2$. The $CO_2$ may be removed in any conventional fashion, e.g. by using a Benfield solution. Typically, the Fischer-Tropsch tail gas is subjected to a water gas shift stage to convert CO to $CO_2$ and to produce more $H_2$. The water gas shift stage would typically be a conventional water gas shift stage, i.e. a sweet shift stage.

The process may include separating $H_2$ from the Fischer-Tropsch tail gas (e.g. using pressure swing adsorption) and recycling the $H_2$ to the one or more Fischer-Tropsch hydrocarbon synthesis stages.

Separating $CO_2$ from the synthesis gas may include treating the synthesis gas to remove sulphur and said $CO_2$. Treating the synthesis gas may be effected in any conventional fashion, e.g. using a Rectisol process which includes a chilled methanol wash.

The process may include compressing at least a portion of the separated $CO_2$ to exceed the operating pressure of a combustor used to generate power from the combustion gas. The compressed $CO_2$ may be mixed with oxygen already at pressure, before feeding the $CO_2$ and oxygen to the combustor.

Recovering or recycling the $CO_2$ from the combusted gas may include treating exhaust gas from the waste heat recovery stage waste heat boiler, comprising predominantly $CO_2$ and water, to remove the water, leaving a $CO_2$ exhaust stream, which may be sequestrated in any conventional fashion, or captured for further use. The $CO_2$ exhaust stream may be combined with further $CO_2$ obtained from the treatment of synthesis gas and/or from the treatment of the Fischer-Tropsch tail gas. The process may include recycling some of the exhaust gas from the waste heat recovery stage waste heat boiler, or some of the $CO_2$ exhaust stream, to the combustor.

The process may include superheating steam from the waste heat recovery stage waste heat boiler using the fuel gas and air. In this event, a stack gas produced by the superheating of the steam should not be mixed with exhaust gas from the waste heat recovery stage waste heat boiler or with the hot exhaust gas from the gas turbine expander.

The process may include using, instead of air, essentially pure oxygen or a combination of essentially pure oxygen and $CO_2$ in at least some fired equipment involved in the production of hydrocarbons. Stack gases from such fired equipment may then be combined to consolidate $CO_2$-producing streams.

BRIEF DESCRIPTION OF THE DRAWINGS

The invention will now be described, by way of example, with reference to the accompanying diagrammatic drawings in which.

DETAILED DESCRIPTION OF THE INVENTION

Figure 1:
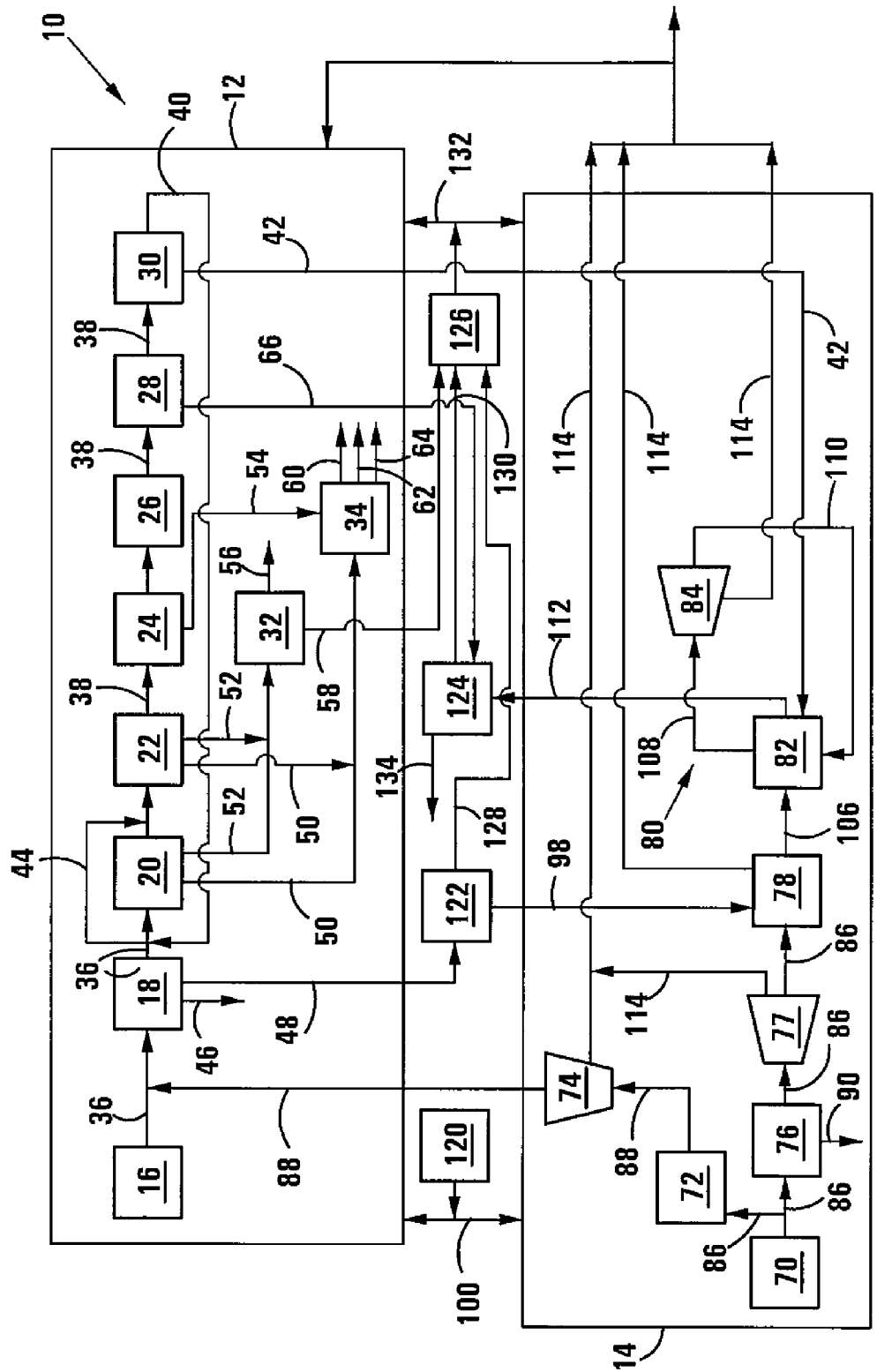
FIG. 1 shows a process in accordance with the invention for a co-producing power and hydrocarbons.

Referring to FIG. 1 of the drawings, reference numeral 10 generally indicates a process in accordance with the invention for co-producing power and hydrocarbons. The process 10 includes a coal-to-liquid (CTL) hydrocarbon synthesis facility generally indicated by reference numeral 12 and an Integrated Gasification Combined Cycle (IGCC) facility generally indicated by reference numeral 14.

The CTL facility 12 includes a dry gasification stage 16, a gas clean-up stage 18, a first Fischer-Tropsch hydrocarbon synthesis stage 20, a second Fischer-Tropsch hydrocarbon synthesis stage 22 in series with the first Fischer-Tropsch hydrocarbon synthesis stage 20, a heavy end recovery stage 24, a water gas or sweet shift stage 26, a $CO_2$ removal stage 28, a hydrogen separation stage 30, a reaction water treatment stage 32 and a product work-up stage 34.

A syngas line 36 leads from the dry gasification stage 16 to the gas clean-up stage 18 and from the gas clean-up stage 18 through the first and second Fischer-Tropsch hydrocarbon synthesis stages 20, 22. A Fischer-Tropsch tail gas line 38 leads from the second Fischer-Tropsch hydrocarbon synthesis stage 22 to the heavy end recovery stage 24 and from there to the water gas or sweet shift stage 26, the $CO_2$ removal stage 28 and eventually to the hydrogen separation stage 30. A hydrogen recycle line 40 leads from the hydrogen separation stage 30 back to the first Fischer-Tropsch hydrocarbon synthesis stage 20 and a fuel gas line 42 leads from the hydrogen separation stage 30 to the IGCC facility 14.

A syngas bypass line 44 bypasses the first Fischer-Tropsch hydrocarbon synthesis stage 20.

A sulphur recovery line 46 and a $CO_2$ line 48 leave the gas clean-up stage 18.

Hydrocarbon product lines 50 and reaction water lines 52 leave the first and second Fischer-Tropsch hydrocarbon synthesis stages 20, 22, with the reaction water lines 52 leading to the reaction water treatment stage 32 and the hydrocarbon product lines 50 leading to the product work-up stage 34. The product work-up stage 34 is also connected to the heavy end recovery stage 24 by means of a light hydrocarbons line 54 leading from the heavy end recovery stage 24 to the product work-up stage 34.

An oxygenates line 56 and water lines 58 leave the reaction water treatment stage 32, whereas an LPG line 60, a naphta line 62 and a diesel line 64 leave the product work-up stage 34.

The $CO_2$ removal stage 28 is provided with a $CO_2$ line 66.

The IGCC facility 14 includes a wet gasification stage 70, a sour shift stage 72, a hydrogen-enriched gas expansion stage 74, a gas clean-up stage 76, a combustion gas expansion stage 77, a gas combustion and expansion stage 78 and a waste heat recovery stage 80 comprising a co-fired waste heat boiler 82 and steam turbines 84.

A combustion gas line 86 leads from the wet gasification stage 70 to the gas clean-up stage 76 and from the gas clean-up stage 76 to the combustion gas expansion stage 77 and from there to the gas combustion and expansion stage 78. The combustion gas line 86 between the wet gasification stage 70 and the gas clean-up stage 76 also branches off to the sour shift stage 72. An $H_2$-enriched gas line 88 leads from the sour shift stage 72 through the hydrogen-enriched gas expansion stage 74 and joins the syngas line 36 between the dry gasification stage 16 and the gas clean-up stage 18 of the CTL facility 12.

A sulphur removal line 90 leaves the gas clean-up stage 76.

Figure 2:
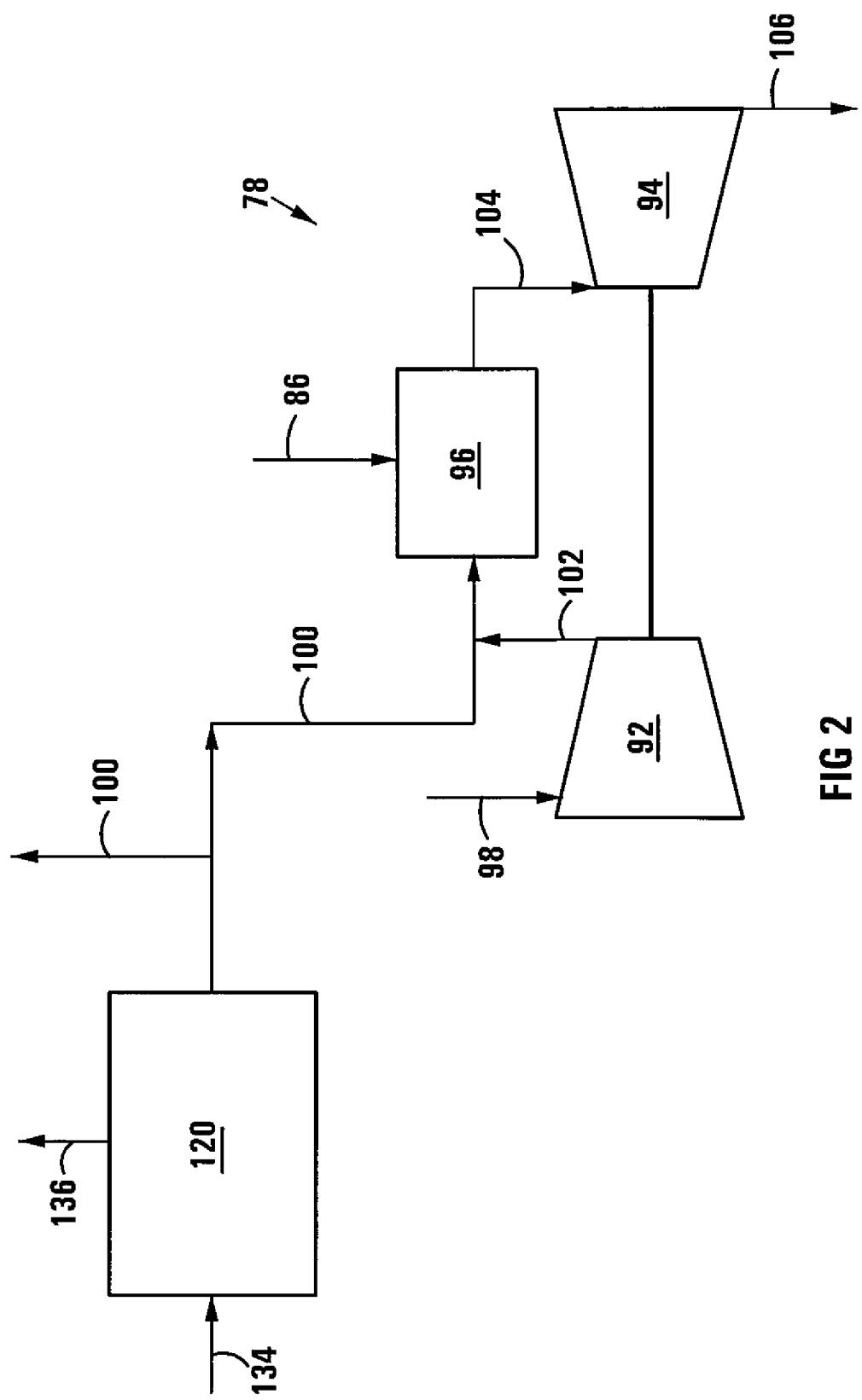
FIG. 2 shows in more detail a portion of the process of FIG. 1.

With reference to FIG. 2 of the drawings, the gas combustion and expansion stage 78 includes a compressor 92 and a gas turbine expander 94 drivingly connected to the compressor 92. The combustion gas line 86 from the combustion gas expansion stage 77 leads to a combustor 96. A $CO_2$ line 98 leads into the compressor 92. A compressed $CO_2$ line 102 leads from the compressor 92 to the combustor 96 and is joined by an oxygen line 100. A hot combusted gas line 104 leads from the combustor 96 to the gas turbine expander 94. A hot exhaust gas line 106 leads from the gas turbine expander 94 to the co-fired waste heat boiler 82 of the waste heat recovery stage 80.

A steam line 108 leads from the co-fired waste heat boiler 82 to the steam turbines 84 and a condensate recycle line 110 leads back from the steam turbines 84 to the co-fired waste heat boiler 82. The co-fired waste heat boiler 82 is joined by the fuel gas line 42 from the CTL facility 12 and is also provided with an exhaust gas line 112.

The hydrogen-enriched gas expansion stage 74, the combustion gas expansion stage 77, the gas combustion and expansion stage 78 and the steam turbines 84 provide electric power generally indicated by reference numeral 114. Electricity can be exported and used internally, e.g. in the CTL facility 12.

The CTL facility 12 and the IGCC facility 14 share an air separation unit 120, a $CO_2$ and water separation stage 122, a $CO_2$ compression and water knock-out stage 124 and a water treatment stage 126.

The oxygen line 100 from the air separation unit 120 leads to the gas combustion and expansion stage 78, as hereinbefore indicated, but also to other oxygen users in both the CTL facility 12 and the IGCC facility 14.

The $CO_2$ line 48 from the gas clean-up stage 18 of the CTL facility 12 leads to the $CO_2$ and water separation stage 122 and the $CO_2$ line 98 leads from the $CO_2$ and water separation stage 122 to the compressor 92 of the gas combustion and expansion stage 78. A water line 128 leads from the $CO_2$ and water separation stage 122 to the water treatment stage 126.

The $CO_2$ compression and water knock-out stage 124 is joined by the exhaust gas line 112 from the waste heat recovery stage 80 and the $CO_2$ line 66 from the $CO_2$ removal stage 28 of the CTL facility 12.

A water line 130 leads from the $CO_2$ compression and water knock-out stage 124 to the water treatment stage 126, which is also joined by the water line 58 from the reaction water treatment stage 32 of the CTL facility 12. One or more treated water lines 132, only one of which is shown for simplicity, leads from the water treatment stage 126 to both the CTL facility 12 and the IGCC facility 14.

Referring again to FIG. 2 of the drawings, the air separation unit 120 is provided with an air feed line 134 and a nitrogen production line 136.

Particulate coal is gasified in the dry gasification stage 16 to produce synthesis gas. The dry gasification stage 16 may employ any conventional entrained flow dry feed gasification technology, e.g. the Shell (trade name) dry gasification technology which produces a synthesis gas with low inert and $CO_2$ content and an $H_2$/CO molar ratio of about 0.4. Although not shown in the drawings, a waste heat boiler is used to cool the synthesis gas, which is typically produced at a pressure of about 45 bar. The waste heat boiler produces process steam (not shown). The synthesis gas is fed by means of the syngas line 36 to the gas clean-up stage 18. The synthesis gas is however first enriched in hydrogen by the $H_2$-enriched gas flowing along the $H_2$-enriched gas line 88, thereby to increase the $H_2$/CO molar ratio so that the $H_2$/CO molar ratio is in the range of between about 0.7 and about 2.5.

In the gas clean-up stage 18 the synthesis gas is cleaned in conventional fashion to remove sulphur, particulate material and $CO_2$. Conventional synthesis gas cleaning technology may be used, e.g. a Rectisol process, amine washes and a $CO_2$ absorption process employing a Benfield solution. Sulphur is removed from the gas clean-up stage 18 by means of the sulphur recovery line 46 and the $CO_2$ is removed by means of the $CO_2$ line 48.

The clean synthesis gas is fed into the first Fischer-Tropsch hydrocarbon synthesis stage 20 and from there into the second Fischer-Tropsch hydrocarbon synthesis stage 22 to convert the synthesis gas to hydrocarbons. Any conventional Fischer-Tropsch hydrocarbon synthesis configuration may be used. In the embodiment shown in FIG. 1 of the drawings, a two-stage process employing a synthesis gas bypass (using the syngas bypass line 44) and a hydrogen recycle (using the hydrogen recycle line 40) is illustrated. The Fischer-Tropsch hydrocarbon synthesis stages 20, 22 may thus include one or more suitable reactors such as a fluidised bed reactor, a tubular fixed bed reactor, a slurry bed reactor or an ebullating bed reactor. It may even include multiple reactors operating under different conditions. The pressure in the reactors may be between 1 bar and 100 bar but in this embodiment a pressure of about 45 bar is used. The temperature may be between 160° C. and 380° C. Reactors will thus contain a Fischer-Tropsch catalyst, which will be in particulate form. The catalyst may contain, as its active catalyst component, Co, Fe, Ni, Ru, Re and/or Rh, but preferable has Fe as its active catalyst component. The catalyst may be provided with one or more promoters selected from an alkaline metal, V, Cr, Pt, Pd, La, Re, Rh, Ru, Th, Mn, Cu, Mg, K, Na, Ca, Ba, Zn and Zr. The catalyst may be a supported catalyst, in which case the active catalyst component, e.g. Co, is supported on a suitable support such as $Al_2O_3$, $TiO_2$, $SiO_2$, ZnO or a combination of these. Preferably, the catalyst is an unsupported Fe catalyst.

In the first Fischer-Tropsch hydrocarbon synthesis stage 20 and the second Fischer-Tropsch hydrocarbon synthesis stage 22, reaction water is produced which is removed by means of the reaction water lines 52 and fed to the reaction water treatment stage 32. In the reaction water treatment stage 32 oxygenates are separated from the reaction water using conventional separation technology and removed by means of the oxygenates line 56. Water is withdrawn from the reaction water treatment stage 32 and fed to the water treatment stage 126 by means of the water line 58.

Hydrocarbon products produced in the first Fischer-Tropsch hydrocarbon synthesis stage 20 and the second Fischer-Tropsch hydrocarbon synthesis stage 22 are removed by means of the hydrocarbon product lines 50 and fed to the product work-up stage 34. In the product work-up stage 34, the hydrocarbon products are worked up to produce LPG gas, naphta and diesel, respectively removed from the product work-up stage 34 by means of the LPG line 60, the naphta line 62 and the diesel line 64.

A Fischer-Tropsch tail gas is removed from the second Fischer-Tropsch hydrocarbon synthesis stage 22 by means of the Fischer-Tropsch tail gas line 38 and fed to the heavy end recovery stage 24 where light hydrocarbons, e.g. $C_3^+$ hydrocarbons are removed in conventional fashion and fed by means of the light hydrocarbons line 54 to the product work-up stage 34 to be worked up with the hydrocarbon products entering the product work-up stage 34 by means of the hydrocarbon product lines 50. The Fischer-Tropsch tail gas is then mixed with steam (not shown) and subjected to the well-known water gas shift reaction to convert CO and water (steam) to $CO_2$ and $H_2$, in the sweet shift stage 26. From the sweet shift stage 26, the Fischer-Tropsch tail gas, now with an increased concentration of $CO_2$ and $H_2$, is then fed to the $CO_2$ removal stage 28. In the $CO_2$ removal stage 28, conventional technology is again used to remove $CO_2$ and water from the Fischer-Tropsch tail gas. Typically, this includes the use of a Benfield solution to absorb the $CO_2$. The $CO_2$ is then again desorbed and the $CO_2$ and water are removed from the $CO_2$ removal stage 28 by means of the $CO_2$ line 66 and fed to the $CO_2$ compression and water knock-out stage 124.

The Fischer-Tropsch tail gas from the $CO_2$ removal stage 28, now with a reduced concentration of $CO_2$ and water, is fed to the hydrogen separation stage 30. In the hydrogen separation stage 30, conventional pressure swing adsorption is used to separate hydrogen from the Fischer-Tropsch tail gas, producing a fuel gas comprising mostly CO and hydrocarbon gasses. The hydrogen is recycled by means of the hydrogen recycle line 40 to the first Fischer-Tropsch hydrocarbon synthesis stage 20. The fuel gas is removed by means of the fuel gas line 42 and fed to the waste heat recovery stage 80 of the IGCC facility 14. Optionally, the fuel gas may be sold as synthetic natural gas and may also be blended with other gas streams to obtain the correct specification for sale.

For purposes of generating power, a coal slurry is gasified in the wet gasification stage 70 of the IGCC facility 14 to produce combustion gas. Any conventional wet gasification technology may be used, such as the General Electric (trade name) slurry fed gasification technology. Water is used as a coal carrier so that a coal slurry is gasified resulting in an $H_2$/CO molar ratio of about 0.96 in the combustion gas produced in the wet gasification stage 70. The combustion gas is typically cooled using a water quench. The combustion gas is produced at a pressure of more than 70 bar.

The combustion gas from the wet gasification stage 70 is removed by means of the combustion gas line 86 and fed to the gas clean-up stage 76. Before the gas clean-up stage 76, a portion of the combustion gas is mixed with steam as required (not shown) and diverted to the sour shift stage 72 where CO and water are converted to $CO_2$ and $H_2$, using the well-known water gas shift reaction. An $H_2$-enriched gas is thus produced in the sour shift stage 72 and the $H_2$-enriched gas is fed by means of the $H_2$-enriched gas line 88 to the hydrogen expansion stage 74. In the hydrogen expansion stage 74, the $H_2$-enriched gas is expanded through an expansion turbine which drives a generator thereby to produce electrical power. In the expansion turbine, the pressure of the $H_2$-enriched gas is dropped from more than 70 bar to about 45 bar, whereafter the $H_2$-enriched gas is mixed with the synthesis gas in the syngas line 36 to increase the $H_2$/CO molar ratio of the synthesis gas as hereinbefore described.

In the gas clean-up stage 76, the combustion gas is cleaned in conventional fashion to remove sulphur along the sulphur removal line 90. The clean combustion gas is then fed to the gas combustion and expansion stage 78 by means of the combustion gas line 86 via the combustion gas expansion stage 77. In the combustion gas expansion stage 77, the clean combustion gas is expanded through a gas turbine expander, reducing the pressure of the combustion gas to the operating pressure of the gas combustion and expansion stage 78, and generating electricity (generally indicated by reference numeral 114).

Air is separated in the air separation unit 120 using conventional cryogenic air separation technology to produce nitrogen and oxygen, as shown in more detail in FIG. 2. The nitrogen is removed by means of the nitrogen line 136 and employed in the CTL facility 12 and the IGCC facility 14 where required, or recovered for commercial purposes or purged. The oxygen from the air separation unit 120 is removed by the oxygen line 100 and also distributed to the CTL facility 12 and the IGCC facility 14 for use where required. A portion of the oxygen is fed by means of the oxygen line 100 to the combustor 96 of the gas combustion and expansion stage 78 (see FIG. 2).

In the $CO_2$ and water separation stage 122, water is knocked from the $CO_2$. The water is fed by means of the water line 128 to the water treatment stage 126. The $CO_2$ is removed from the $CO_2$ and water separation stage 122 and fed to the compressor 92 of the gas combustion and expansion stage 78.

$CO_2$ in the $CO_2$ line 98 is thus fed to the compressor 92 and compressed. The compressed $CO_2$ is mixed with high pressure oxygen from the oxygen line 100 and the compressed $CO_2$ and oxygen mixture is fed by means of the compressed $CO_2$ and oxygen line 102 to the combustor 96. Combustion gas fed by means of the combustion gas line 86 is combusted in the combustor 96, in the presence of the $CO_2$ and oxygen to produce a hot combusted gas. The hot combusted gas is removed by means of the hot combusted gas line 104 and passed through the gas turbine expander 94 which inter alia drives the compressor 92 by means of a direct mechanical coupling. The gas turbine expander 94 is also used to drive generators (not shown) to generate electric power generally indicated by reference numeral 114. A hot exhaust gas, comprising mostly $CO_2$ and water, is removed from the gas turbine expander 94 by means of the hot exhaust gas line 106 and fed to the co-fired waste heat boiler 82 of the waste heat recovery stage 80. The waste heat boiler 82 is fired with fuel gas fed by means of the fuel gas line 42 and produces high pressure steam which is fed by means of the steam line 108 to the steam turbines 84 which are used to drive generators (not shown) to generate electric power generally indicated by reference numeral 114. Condensate is recycled from the steam turbines 84 to the co-fired waste heat boiler 82.

The gas turbine expander 94 and/or the steam turbines 84 may be integrated with the air separation unit 120 to drive air compressors of the air separation unit 120 by means of direct mechanical coupling.

In the co-fired waste heat boiler 82, the exhaust gas produced by the combustion of the fuel gas is combined with the exhaust gas from the gas turbine expander 94 and removed by means of the exhaust gas line 112. As will be appreciated, this exhaust gas comprises mostly $CO_2$ and water. The exhaust gas is fed to the $CO_2$ compression and water knock-out stage 124 where it is compressed. Water is knocked out from the compressed $CO_2$ and fed by means of the water line 130 to the water treatment stage 126. The compressed $CO_2$ from the $CO_2$ compression and water knock-out stage 124 is available for sequestration or capture, as indicated by reference numeral 134. The compressed $CO_2$ may thus for example be employed for enhanced oil recovery (EOR) or enhanced coal-bed methane recovery (ECBMR).

In the water treatment stage 126, water fed to the water treatment stage 126 along the water lines 58, 128 and 130 are treated to produce water of requisite levels. The treated water is removed by means of the treated water lines 132 and distributed to both the CTL facility 12 and the IGCC facility 14, inter alia to be used as boiler feed water.

Selecting a gasification technology best suited to a particular venture involves consideration of various factors, including feedstock characteristics, capital cost, operating cost, reliability, intended application of the produced synthesis gas, etc. The invention, as illustrated, provides an integrated IGCC power plant and CTL plant which benefit from optimal economies of scale of the capital intensive parts and also provide for $CO_2$ capturing or sequestration. A combination of dry gasification and wet gasification is used to provide intermediate streams suited to hydrocarbon synthesis and power production respectively. Advantageously for power production, a wet gasification process can supply combustion gas at pressures higher than 70 bar. A dry gasification process can supply synthesis gas precursor at pressures matching the requirement for Fischer-Tropsch hydrocarbon synthesis, typically around 45 bar. The combustion gas typically has a higher hydrogen content than the synthesis gas precursor, a portion of the combustion gas thus providing a suitable feed material for enrichment with hydrogen to upwardly adjust the molar ratio of $H_2$ and CO of the synthesis gas precursor. Furthermore, the wet gasification stage typically employs a water quench and the combustion gas is thus saturated with water at relatively high temperature. Advantageously, the steam requirement of the sour shift used to enrich the first portion of the combustion gas with hydrogen is thus reduced. In addition, the dry gasification stage typically employs a waste heat boiler providing process steam. Overall energy efficiency is thus enhanced by the combination of dry- and wet gasification technologies, because the dry gasification approach is more efficient at producing a synthesis gas rich in carbon monoxide and the required process steam, while the wet gasification process is the most efficient approach to produce an enriched hydrogen gas.

Advantageously, the IGCC facility may be appropriately sized for internal consumption of energy only or, instead, if there is a suitable market for electricity in the vicinity, the IGCC facility may be sized to maximise economy of scale for the export of power.

Air separation units are expensive to construct and energy-intensive to operate due to large compression requirements. Advantageously, when an IGCC facility and a CTL facility share an air separation unit, economy of scale lowers the cost per unit volume of oxygen required by the CTL facility. Power-producing turbines of the IGCC facility may be integrated by direct mechanical coupling to air compressors of the air separation unit, resulting in improved plant energy efficiency, since a loss in efficiency associated with electrical power generation is avoided.

Sharing of utilities lowers the cost of expensive ultra-pure water used as boiler feed water make-up to produce steam for use in the steam turbines in the IGCC facility. Savings can also be realised in utility costs for the CTL plant because of better economies of scale.

Fuel gas produced by the CTL facility, which in many cases would be purged, can be used as fuel in the IGCC facility, e.g. in heat recovery units of the IGCC facility. This allows the production of steam at a higher pressure and/or a higher temperature. As the fuel gas will come as internal transfer from a large scale facility, costs will be reduced. From the perspective of the CTL facility, this option provides an internal and assured consumer for the fuel gas stream.

Power for internal consumption on the CTL facility is generated at optimal cost and efficiency, improving the overall carbon and plant efficiency of the integrated CTL and IGCC facilities compared to that of two stand-alone facilities.

Finally, the integration of a CTL facility and an IGCC facility allows capturing of $CO_2$ from the off-gas of the IGCC facility. This is achieved by directing a portion of the $CO_2$ produced in the CTL facility, to the compressor of the gas turbine expander of the IGCC facility, together with pure oxygen from an air separation unit, thereby avoiding the introduction of nitrogen into the combustor of the IGCC facility. This allows the gas turbine to be run using a mixture of oxygen and $CO_2$ as temperature moderating agent instead of a conventional mixture of oxygen and $N_2$ when air is used. The final off-gas from the IGCC facility will thus be a relatively pure combination of $CO_2$ and water vapour, which can be combined with the remaining $CO_2$ produced by the CTL facility for export, allowing the $CO_2$ processing and compression facilities to benefit from an increased economy of scale.

The invention claimed is:

1. A process for co-producing power and hydrocarbons, the process including gasifying coal to produce a synthesis gas and a combustion gas both comprising at least CO, $H_2$ and $CO_2$ and being at elevated pressure; separating $CO_2$ from the synthesis gas; synthesizing hydrocarbons from the synthesis gas; generating power from the combustion gas, including combusting the combustion gas in the presence of oxygen and in the presence of at least a portion of said separated $CO_2$ as moderating agent to produce the combusted gas which includes $CO_2$; and recovering or recycling the $CO_2$ from the combusted gas or a gas derived therefrom.

2. The process as claimed in claim 1, in which coal is gasified in a wet gasification stage to produce the combustion gas and in a dry gasification stage to produce the synthesis gas.

3. The process as claimed in claim 1, in which the molar ratio of $H_2$ and CO in the combustion gas is higher than the molar ratio of $H_2$ and CO in the synthesis gas.

4. The process as claimed in claim 1, in which the molar ratio of $H_2/CO$ in the combustion gas is at least 0.6.

5. The process as claimed in claim 1, in which the molar ratio of $H_2/CO$ in the synthesis gas is between about 0.3 and about 0.6.

6. The process as claimed in claim 1, which includes enriching a first portion of the combustion gas with $H_2$ to produce an $H_2$-enriched gas.

7. The process as claimed in claim 6, which includes purifying a portion of the $H_2$-enriched gas to produce essentially pure hydrogen.

8. The process as claimed in claim 6, which includes mixing at least a portion of the $H_2$-enriched gas with the synthesis gas, prior to synthesizing hydrocarbons from the synthesis gas, to provide synthesis gas with a higher molar ratio of $H_2/CO$.

9. The process as claimed in claim 8, in which the $H_2$-enriched gas is at elevated pressure and in which mixing at least a portion of the $H_2$-enriched gas with the synthesis gas includes passing the $H_2$-enriched gas through an expansion turbine to generate power.

10. The process as claimed in claim 1, in which generating power from the combustion gas includes expanding the combusted gas through a gas turbine expander to generate power and to produce hot exhaust gas, and recovering heat from the hot exhaust gas in a waste heat recovery stage which includes a waste heat boiler generating steam.

11. The process as claimed in claim 10, in which the waste heat boiler is a co-fired waste heat boiler and in which the synthesising of hydrocarbons from the synthesis gas produces a fuel gas, the waste heat boiler being co-fired with the fuel gas to raise the pressure and/or the temperature of the steam generated by the waste heat boiler.

12. The process as claimed in claim 1, in which the synthesising of hydrocarbons from the synthesis gas includes Fischer-Tropsch synthesis using one or more Fischer-Tropsch hydrocarbon synthesis stages, producing one or more hydrocarbon product streams and a Fischer-Tropsch tail gas which includes $CO_2$, CO and $H_2$.

13. The process as claimed in claim 1, which includes compressing at least a portion of the separated $CO_2$ to exceed the operating pressure of a combustor used to generate power from the combustion gas, and mixing the compressed $CO_2$ with oxygen already at pressure, before feeding the $CO_2$ and oxygen to the combustor.

14. The process as claimed in claim 10, in which recovering or recycling the $CO_2$ from the combusted gas includes treating exhaust gas from the waste heat boiler, comprising predominantly $CO_2$ and water, to remove the water, leaving a $CO_2$ exhaust stream, which is sequestrated or captured for further use.

\* \* \* \* \*

UNITED STATES PATENT AND TRADEMARK OFFICE
CERTIFICATE OF CORRECTION

PATENT NO. : 8,552,073 B2 Page 1 of 1
APPLICATION NO. : 12/526822
DATED : October 8, 2013
INVENTOR(S) : Jan Hendrik Duvenhage Boshoff, Isabella Lodewina Greeff and Andre Peter Steynberg It is certified that error appears in the above-identified patent and that said Letters Patent is hereby corrected as shown below:

In the Claims

Claim 1, Column 10, line 67, replace "the combusted" with --a combusted--.

Signed and Sealed this
Fourth Day of February, 2014

Michelle K. Lee
*Deputy Director of the United States Patent and Trademark Office*